(12) United States Patent
Byl

(10) Patent No.: US 6,213,058 B1
(45) Date of Patent: Apr. 10, 2001

(54) ANIMAL CHUTE (75) Inventor: John Byl, Sioux Center, IA (US)

(73) Assignee: Sioux Automation Center, Inc., Sioux Center, IA (US)

( * ) Notice: Subject to any disclaimer, the term of this patent is extended or adjusted under 35 U.S.C. 154(b) by 0 days.

(21) Appl. No.: 09/251,813

(22) Filed: Feb. 17, 1999

(51) Int. Cl.[7] .............................. A01K 29/00; A01K 1/00
(52) U.S. Cl. .................................................. 119/843
(58) Field of Search ............................... 119/840, 906, 119/908, 729, 734, 738, 744, 751

(56) References Cited

U.S. PATENT DOCUMENTS

| | | |
|---|---|---|
| Re. 33,959 | 6/1992 | Mollhagen . |
| 779,658 | 1/1905 | Leonard . |
| 3,545,407 | 12/1970 | Moore . |
| 3,799,115 | 3/1974 | Fullerton et al. . |
| 4,191,131 | 3/1980 | Farlow . |
| 4,275,685 | 6/1981 | Hopkins . |
| 4,280,448 | 7/1981 | Ostermann . |
| 4,535,723 | 8/1985 | Gealy . |
| 4,617,876 | 10/1986 | Hayes . |
| 4,829,936 | 5/1989 | Mollhagen . |
| 4,987,861 * | 1/1991 | Lemire et al. ............... 119/159 |
| 5,063,880 * | 11/1991 | Bouthillier ................... 119/159 |
| 5,183,008 * | 2/1993 | Carrano ....................... 119/155 |
| 5,628,284 * | 5/1997 | Sheen et al. ................. 119/840 |
| 5,651,333 * | 7/1997 | Fisher ........................... 119/734 |
| 5,653,192 * | 8/1997 | Sheen et al. ................. 119/51.02 |
| 5,673,647 * | 10/1997 | Pratt ............................. 119/51.02 |
| 5,778,820 * | 7/1998 | Van Der Lely et al. ..... 119/14.18 |
| 5,803,015 * | 9/1998 | Rhodes et al. .............. 119/14.02 |
| 5,950,562 * | 9/1999 | Schulte et al. .............. 119/51.02 |

* cited by examiner

Primary Examiner—Thomas Price
(74) Attorney, Agent, or Firm—Kent A. Herink; Timothy G. Hofmeyer; Davis Brown Law Firm (57) ABSTRACT

An animal chute with animal-actuated gates at each end and a data collection area. The animal enters the chute through one of the gates and both gates automatically lock the animal in the data collection area until the data is collected. The opposite gate then unlocks in order to let the animal exit the chute. The animal chute also has a side safety gate which breaks away upon pressure from the animal in order to allow it to escape. Data such as animal identification and weight is gathered in the data collection area. The gates may be operated with a linkage system and electric linear actuators. The data may be transmitted to a personal computer in order for the data to be stored and analyzed. The chute may be controlled with a programmable logic controller. The chute may be used in conjunction with additional directing devices in order to sort animals which pass through the chute.

15 Claims, 12 Drawing Sheets

ISO VIEW
AFTER ASSEMBLY

ANIMAL CHUTE

BACKGROUND OF THE INVENTION

The present invention relates to an animal chute with animal-actuated locking gates that allows data to be gathered while the animal is detained in the chute. After data gathering, the gates will open to allow the animal to access a second area. The chute is also equipped with a safety feature of a breakaway panel which releases upon application of pressure from the animal.

It is common practice in the livestock industry to closely monitor the weight and other data concerning one's animals. This information is used for various purposes such as segregation based upon a predetermined weight which will provide a maximum financial return under prevailing market conditions. Various conventional devices have been developed for monitoring and sorting animals. However, many of the conventional devices are relatively expensive or are relatively labor intensive and often require several operators.

Therefore, a device is desired which would allow automated and/or animal-actuated monitoring and mechanical separation of animals into segregated areas. It is also desirable to have a device wherein the animals cannot easily exit the device in either direction until the data collection process is complete. It is also important not to overly arouse the animals so they will not injure themselves, to minimize dangerous parts common in conventional devices, and to provide an escape means which the animal can use.

SUMMARY OF THE INVENTION

The chute of the present invention, is animal-actuated. This allows the animal to push its way though the chute, and no person is needed to open or close the gates. Alternatively, the chute may be equipped with sensors, such as infrared beams, which will signal the gates to open for the animal, so the animal need not push on the gates to activate them. The gates may be operated via any mechanism, e.g., the preferred embodiment uses a linkage system. More preferably, the linkage system is moved by an electric linear actuator. The gate functions can be controlled by a programmable logic controller. When the animal enters the chute, the front and rear gates lock. Once inside, data can be gathered, such as identification of the animal, weight, time of day, how much feed it has eaten, etc. Data can be gathered manually, but preferably automatically, e.g., identification of the animal can be accomplished with the use of radio frequency reader panels mounted to each end of the chute which read radio frequency ear tags on the animals, and weight can be determined by a scale. The data is recorded. This can be done with a personal computer. Once the data is transmitted to the personal computer, the data is easily stored and/or analyzed. After data gathering, the chute will release the animal. The animal-actuated chute could also be used for vaccination or other purposes. The device also includes a safety gate which allows the animal to escape, should it become scared. The side panel of the chute is held in place with a breakaway latch but releases when pressure is put on it like an animal kicking it. The safety gate will fall away and allow the animal to reenter the population. The panel then is replaced, manually. Alternatively, the panel could be designed to automatically reset once the animal is released.

The chute is designed to be placed between a feeding and/or watering area and the rest of the pen so that when the animal wants to eat or drink, it must go through the chute. The chute is also designed so that it may work with a series of gates which would allow it to work with two or more pens, so as to not mix the animals.

The chute can be associated with one divided pen or segregation area or a multiplicity of pens for directing the animals to desired locations based on the data collected. One or multiple areas may be located at either end of the device.

OBJECTS OF THE INVENTION

An object of the invention is to provide an animal chute wherein animals may self-actuate the gates, and the gates automatically lock and unlock in order to detain the animal long enough to collect data and then allow the animal to continue passing through the chute.

Another object of the invention is to provide a device which can automatically monitor animals without the need for human labor or intervention.

A further object of the invention is to provide a device which can be used to facilitate segregation of animals based on particular criteria.

Other objects and advantages of this invention will become apparent from the following description taken in connection with the accompanying drawings wherein are set forth by way of illustration and example, certain embodiments of this invention.

DETAILED DESCRIPTION OF THE PREFERRED EMBODIMENT

It is to be understood that the disclosed embodiments are merely exemplary of the invention which may be embodied in various forms. Therefore, specific structural and functional details disclosed herein are not be interpreted as limiting, but merely as a basis for the claims and as a representative basis for teaching one skilled in the art to variously employ the present invention in virtually any appropriately detailed structure. The following is an illustrative embodiment of the device which is shown in FIGS. 1–8. Applications of the device are illustrated in FIGS. 9–13.

Figure 1:
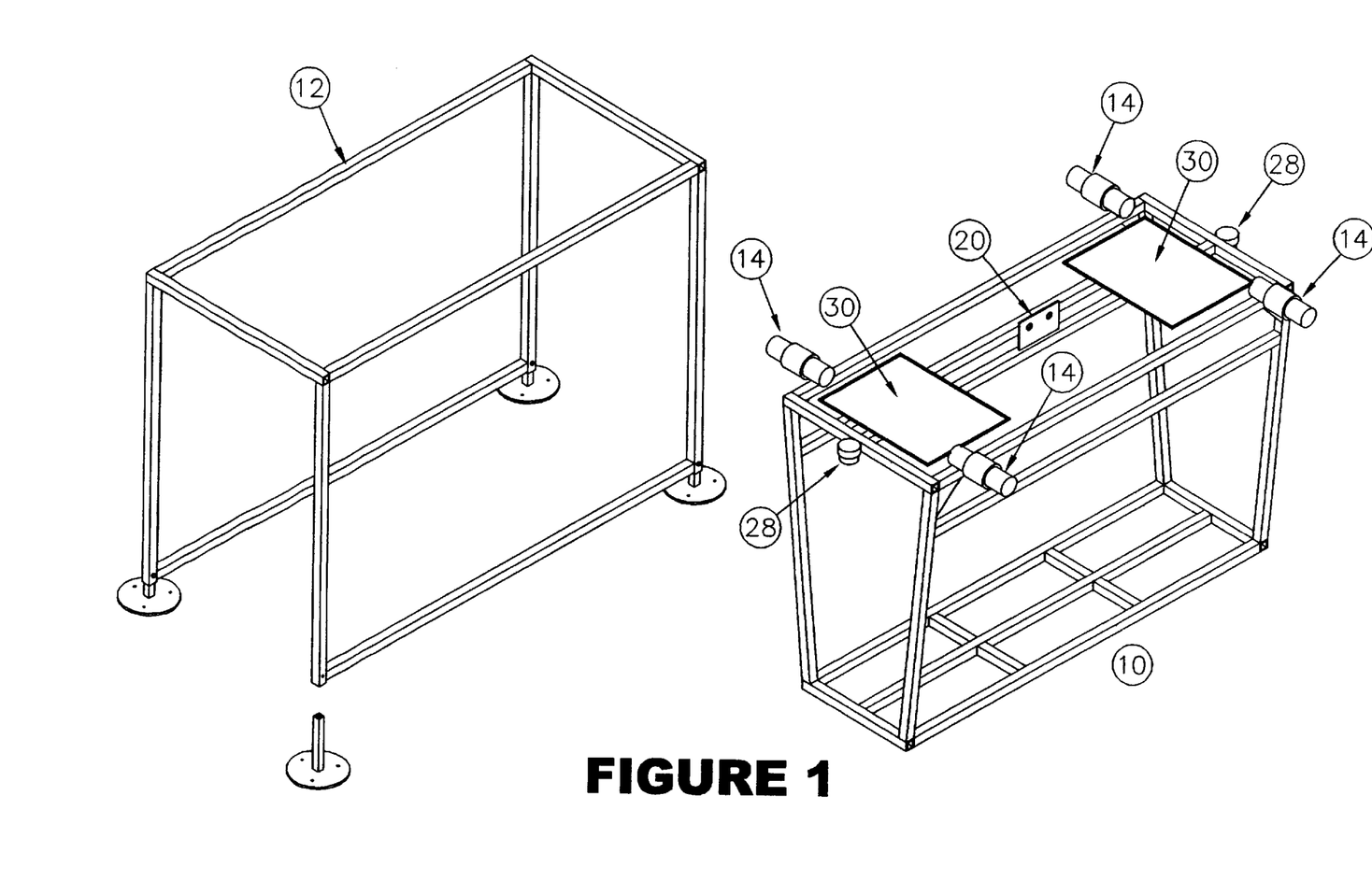
FIG. 1 is an isometric view of the frame and chute, according to the present invention.

The animal chute 10 is suspended in a support frame 12 via load cells 14 (FIG. 1). Alternatively, the chute 10 may be welded or otherwise attached to a support frame 12. The chute 10 could even be free-standing. There is an animal-actuated first gate 16 at one end and an animal-actuated second gate 18 at the opposite end. The gates 16, 18 are operated via a linkage system 20. A safety gate 22 attaches to one side of the chute 10. The safety gate 22 is attached to the chute via hinges 24 at the bottom and the breakaway latches 26 at the top. Infared beams 28 are attached at each end which serve to allow the animal to actuate the device. Radio frequency panels 30 located at each end of the device allow of data gathering from radio frequency animal ear tags or similar identification devices.

Figure 2:
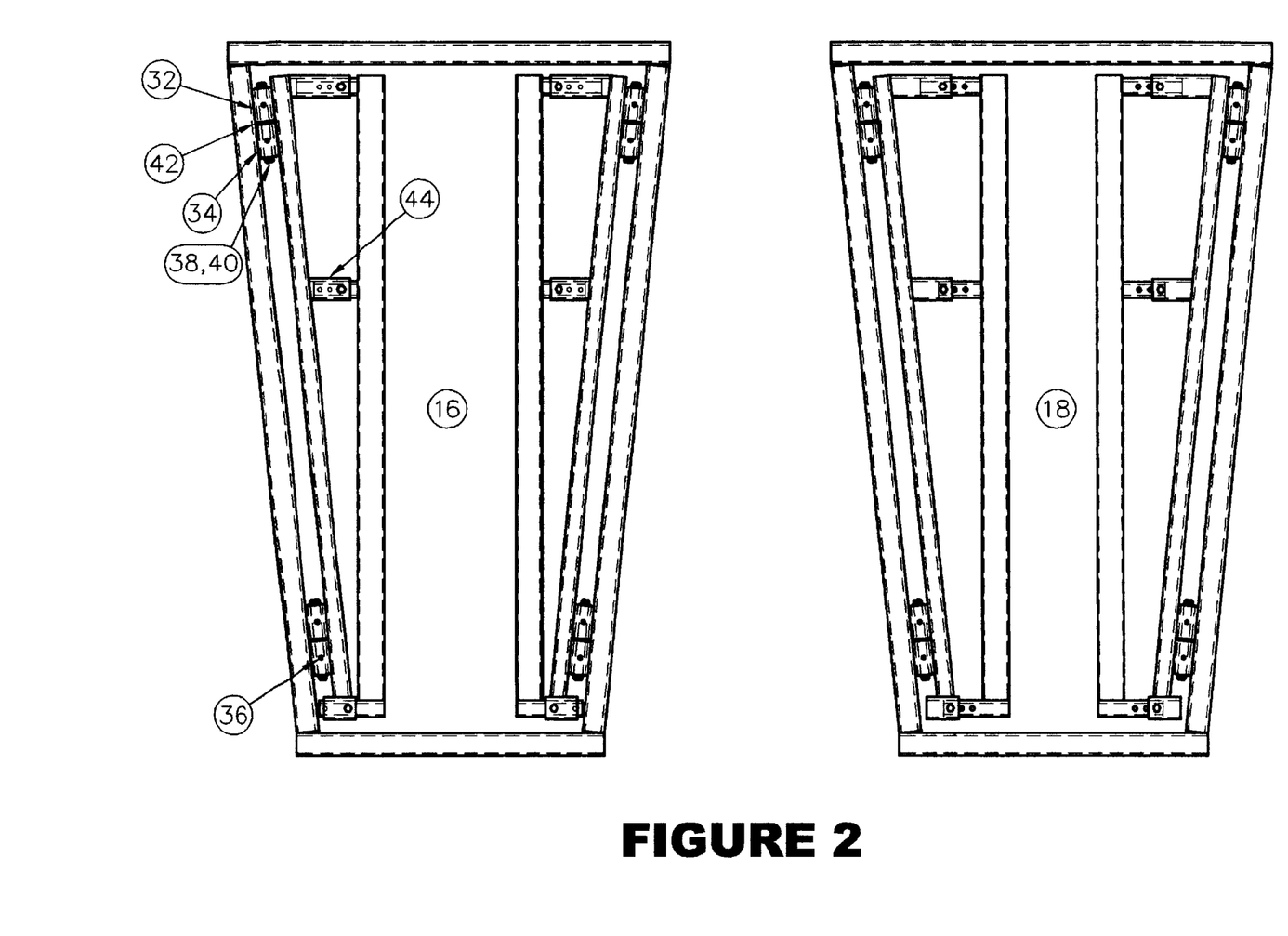
FIG. 2 is a plan view of the end gates.

The gates 16, 18 are attached to the chute 10 via hinges 32. The hinges are standard hinges for such heavy duty uses. For example, FIG. 2 of the gates 16, 18 show a hinge comprised of an outside sleeve 34 with grease zerks 36, a bushing 38, a hinge pin 40, and a spacer 42. The gates 16, 18 as shown in FIG. 2 are trapezoidal-shaped and include telescoping horizontal adjustments 44 which allow the spacing between the gates 16, 18 to be adjusted to accommodate different sized animals. The structure of the gates 16, 18 are not critical as long as the functions are served.

The gates 16, 18 open to the detected presence (e.g., breaking an infrared beam 28 or pressure of an animal against a gate) of the animal trying to enter the chute 10. The first gate 16 or second gate 18 opens to allow the animal to enter. The opposite gate 18, 16 is locked when the animal is entering in order to prevent the animal from leaving the chute 10. Once the animal is completely inside the chute 10, the first gate 16 (or second gate 18, if that is the gate entered) locks behind the animal. The gates 16, 18 remain locked while data is gathered from the animal (e.g., FIG. 12). Examples of data that may be gathered are identification of the animal or the animal's weight. A scale may added to the bottom of the chute 10 for such a purpose in addition to any identification sensors such as the radio frequency panels 30 described above. The structure of the gates 16, 18 are not critical, so long as any structure supports the function.

Figure 5:
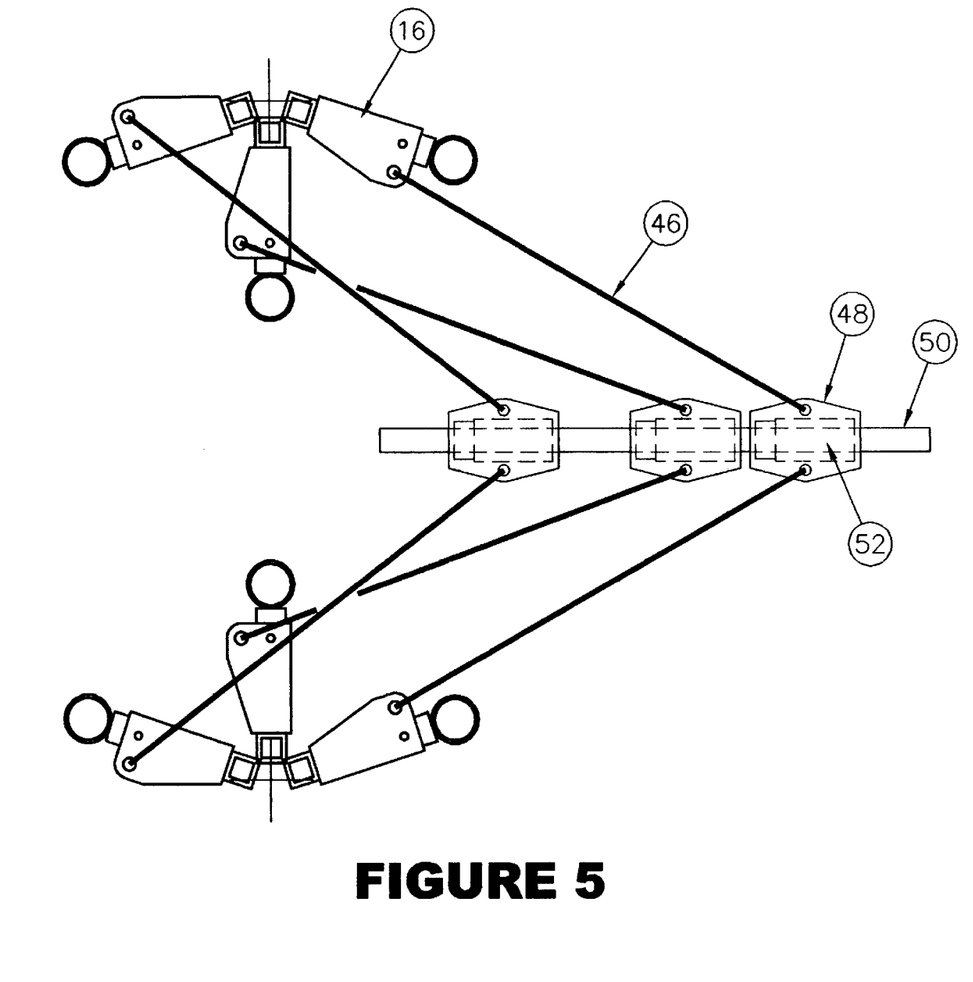
FIG. 5 is a detail of the door operating linkage.
Figure 8A:
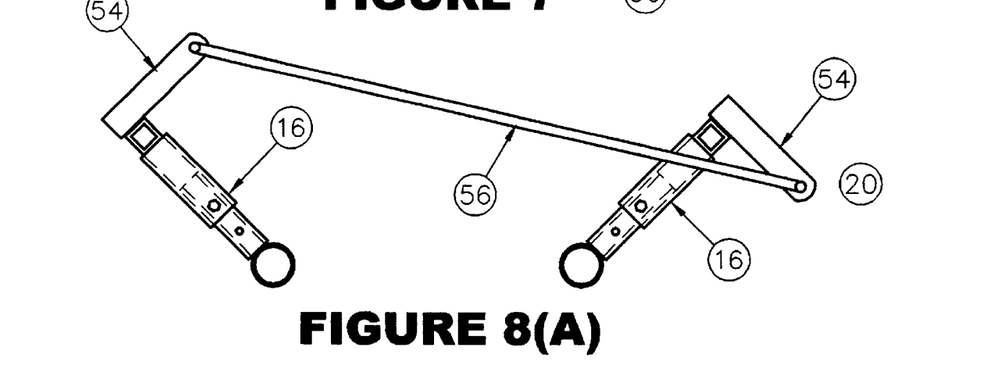
FIG. 8(a) is a top view of the gates with an alternative linkage system in a closed position.
Figure 8B:
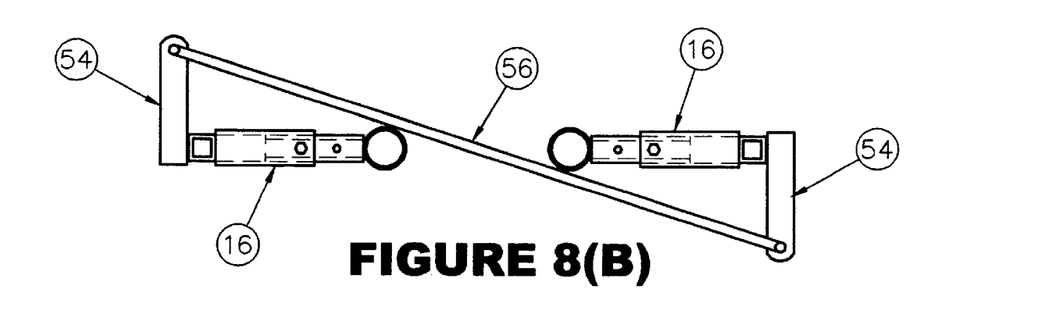
FIG. 8(b) is a top view of the gates with an alternative linkage system in an open position.
Figure 8C:
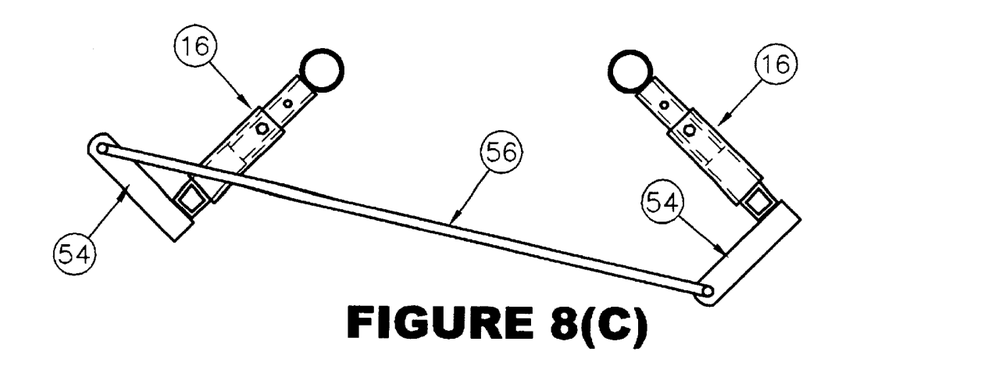
FIG. 8(c) is a top view of the gates with an alternative linkage system in an opposite open position as FIG. 8(b).
Figure 9:
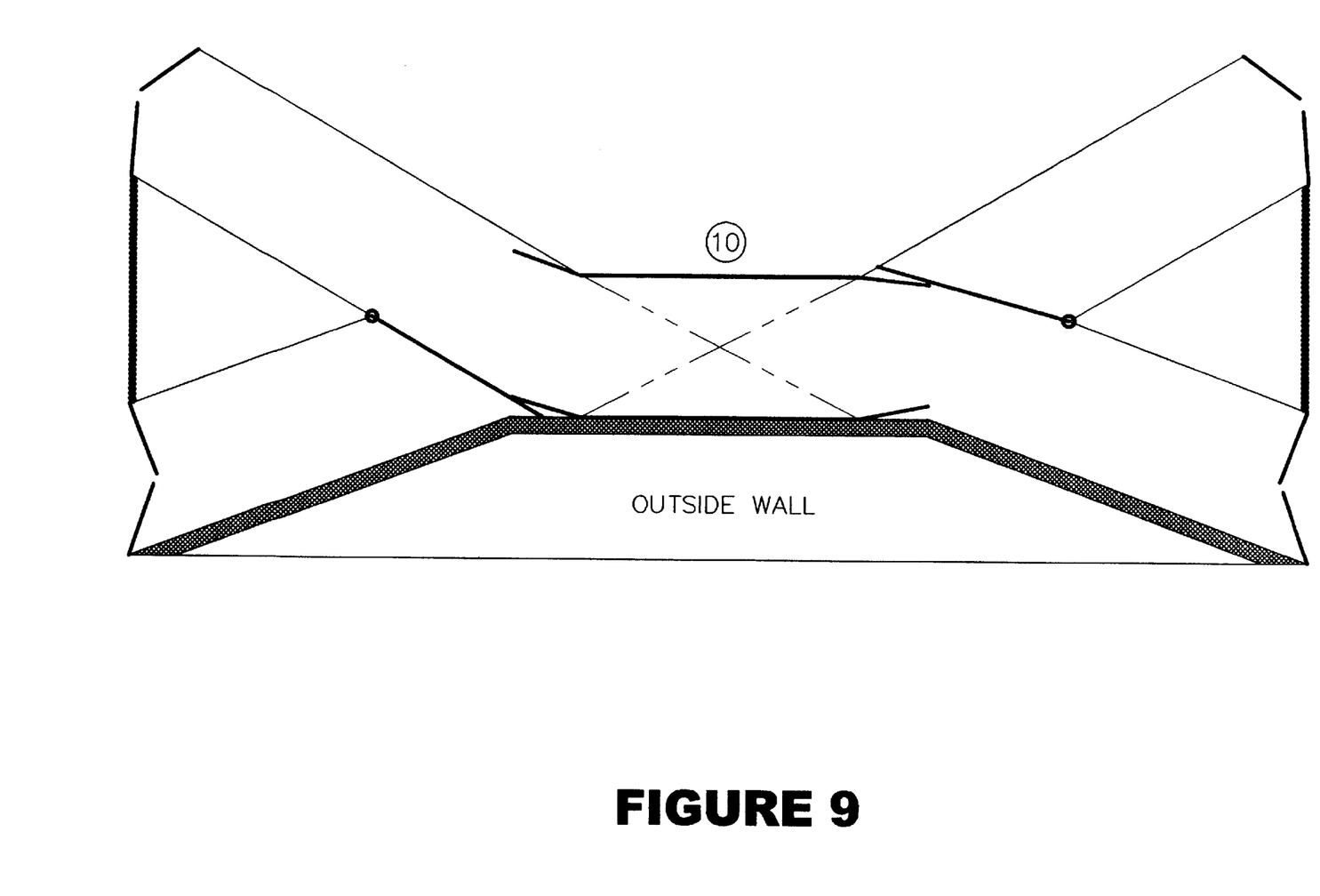
FIG. 9 is a top plan view of the animal chute installed in between a set of four pens in which two sets of animals can utilize the chute without mixing.
Figure 10:
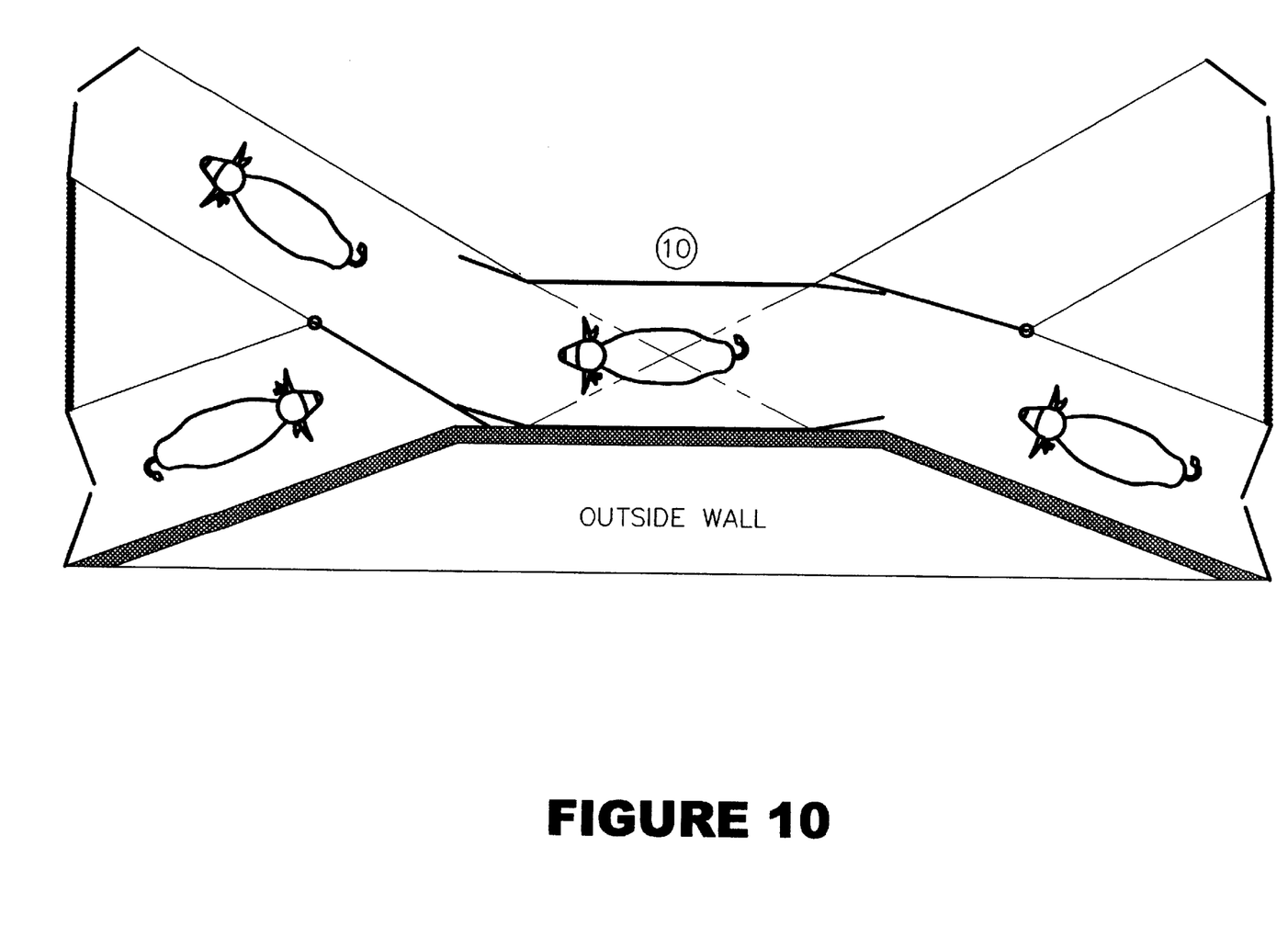
FIG. 10 is a top plan view of animals crossing the chute from right to left, while animals from the left are blocked.
Figure 11:
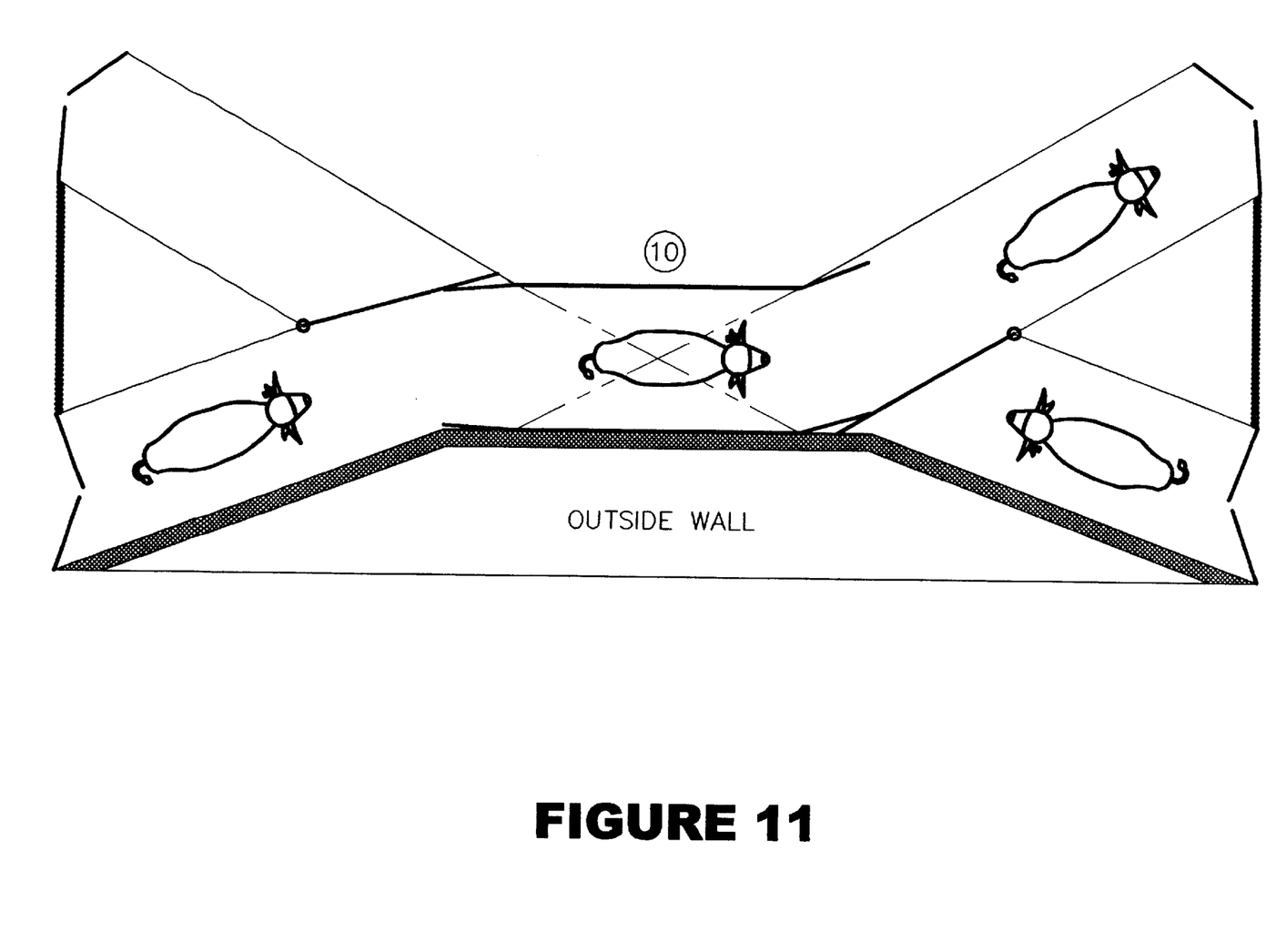
FIG. 11 is a top plan view of animals crossing the chute from left to right, while animals from the right are blocked.
Figure 12:
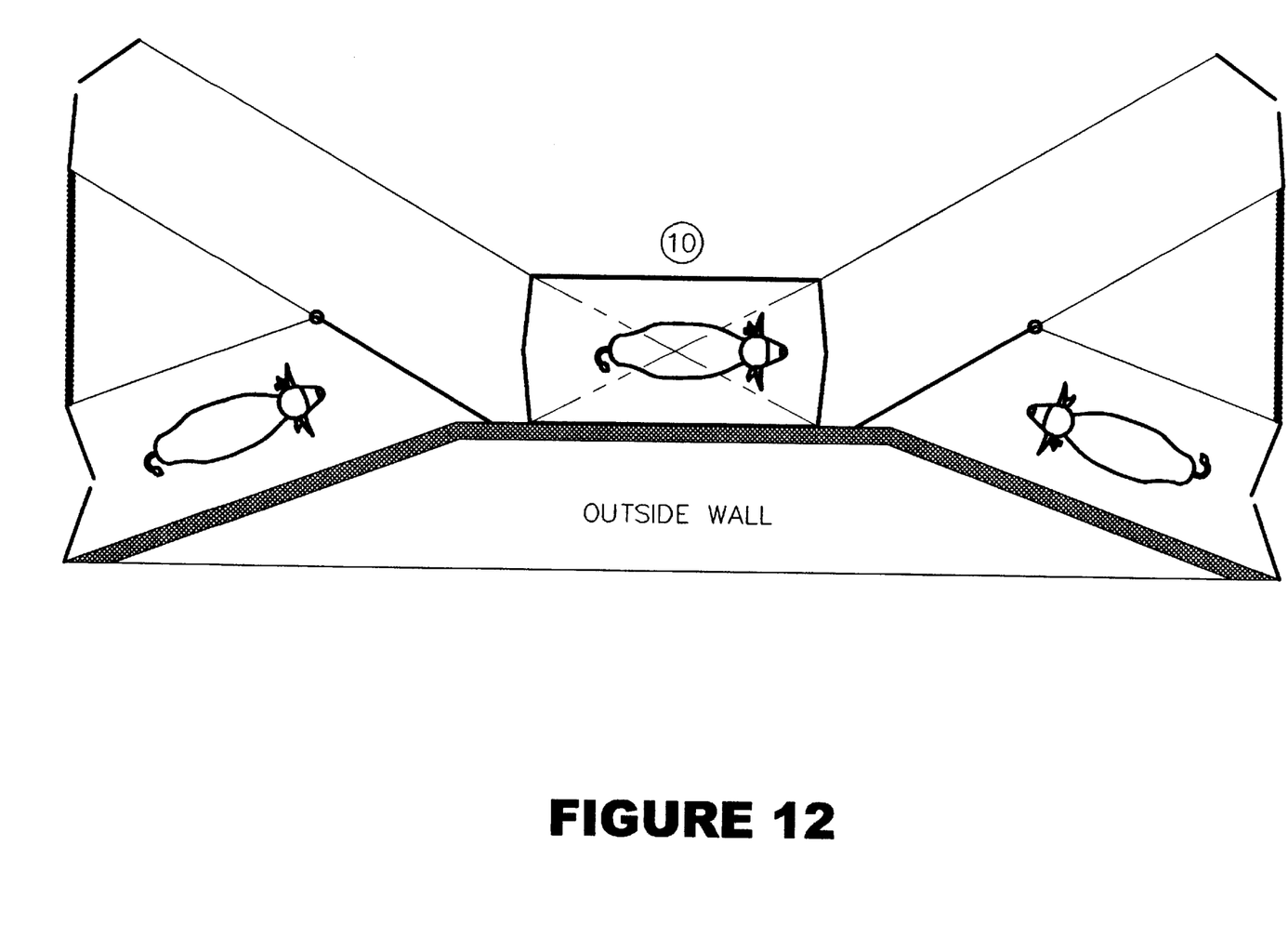
FIG. 12 is a top plan view of the animal chute where an animal is blocked in the center for data collection purposes, while animals from the left and right wait.
Figure 13:
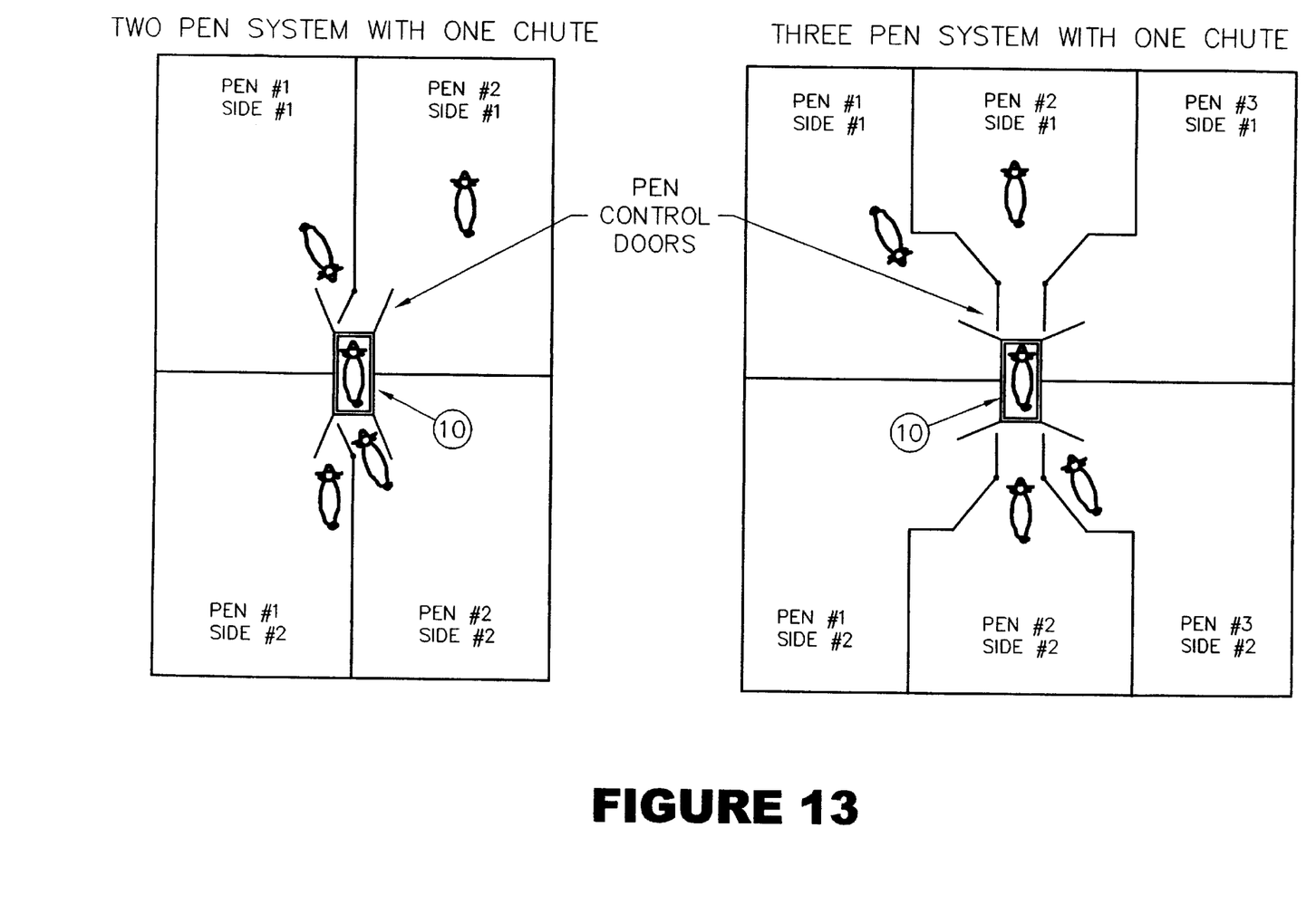
FIG. 13 is a plan view of alternative systems using the chute to direct animals within multi-pen arrangements.

The linkage system 20 is shown in detail in FIG. 5. The linkage system 20 is comprised of a linkage 46 which attaches to the top of the first gate 16 and a slide 48 on a stationary shaft 50. The slide 48 can be moved in either direction along the shaft 50 via an electrical linear actuator 52. There is a similar or identical linkage system 20 which attaches to the top of the second gate 18. An example of an alternative linkage system, FIG. 8(a–c), comprises a linkage mount 54 attached to the gate 16 or 18 and a linkage 56 attached between the two mounts 54. The linkage mounts 54 are attached to the sides of the gates 16, 18 and extend in opposite directions as indicated in FIGS. 8(a–c). Any system which operates the gates 16, 18 such that they open, close, lock, and unlock as described can be used.

Figure 3:
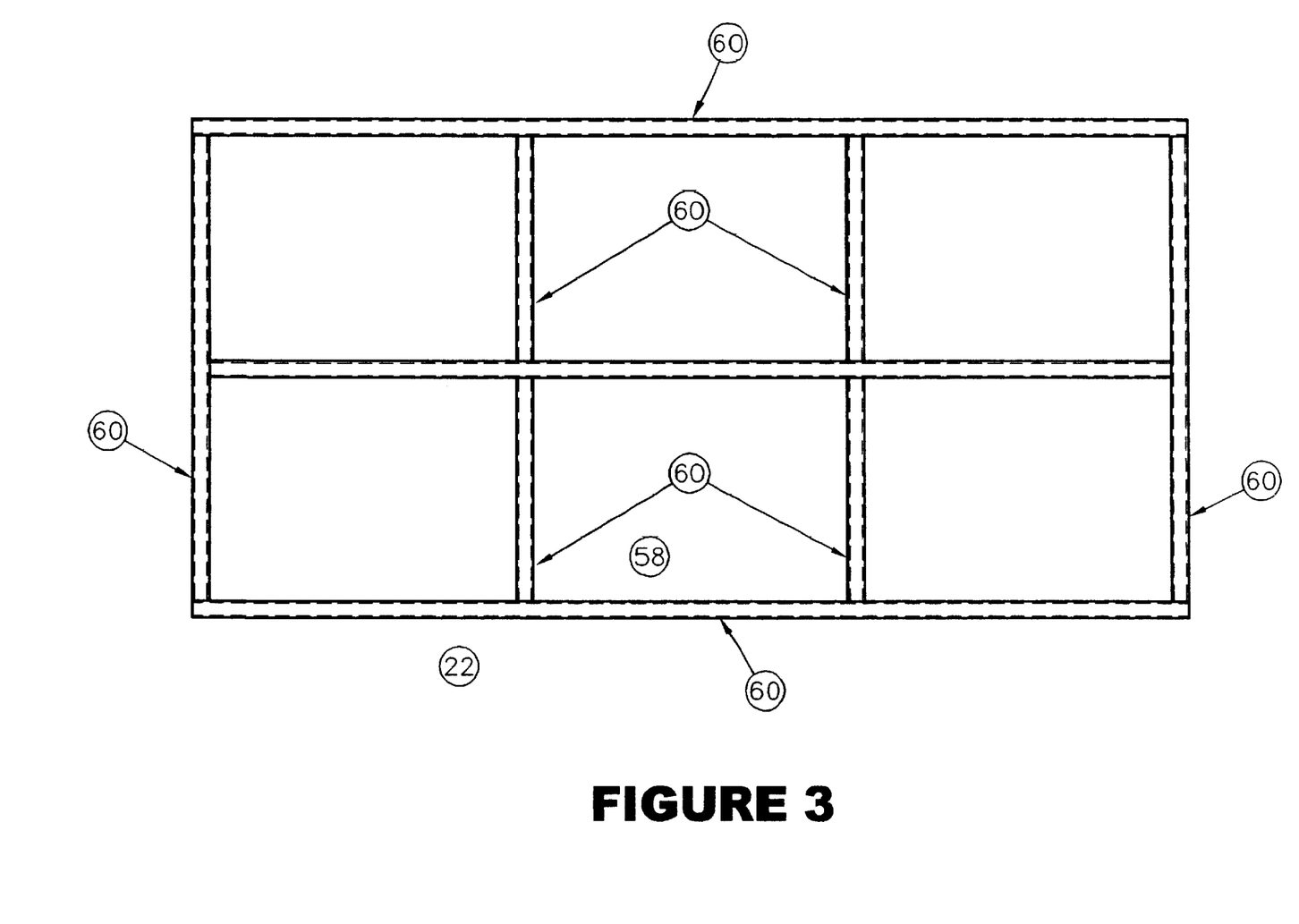
FIG. 3 is a plan view of the safety gate.
Figure 4:
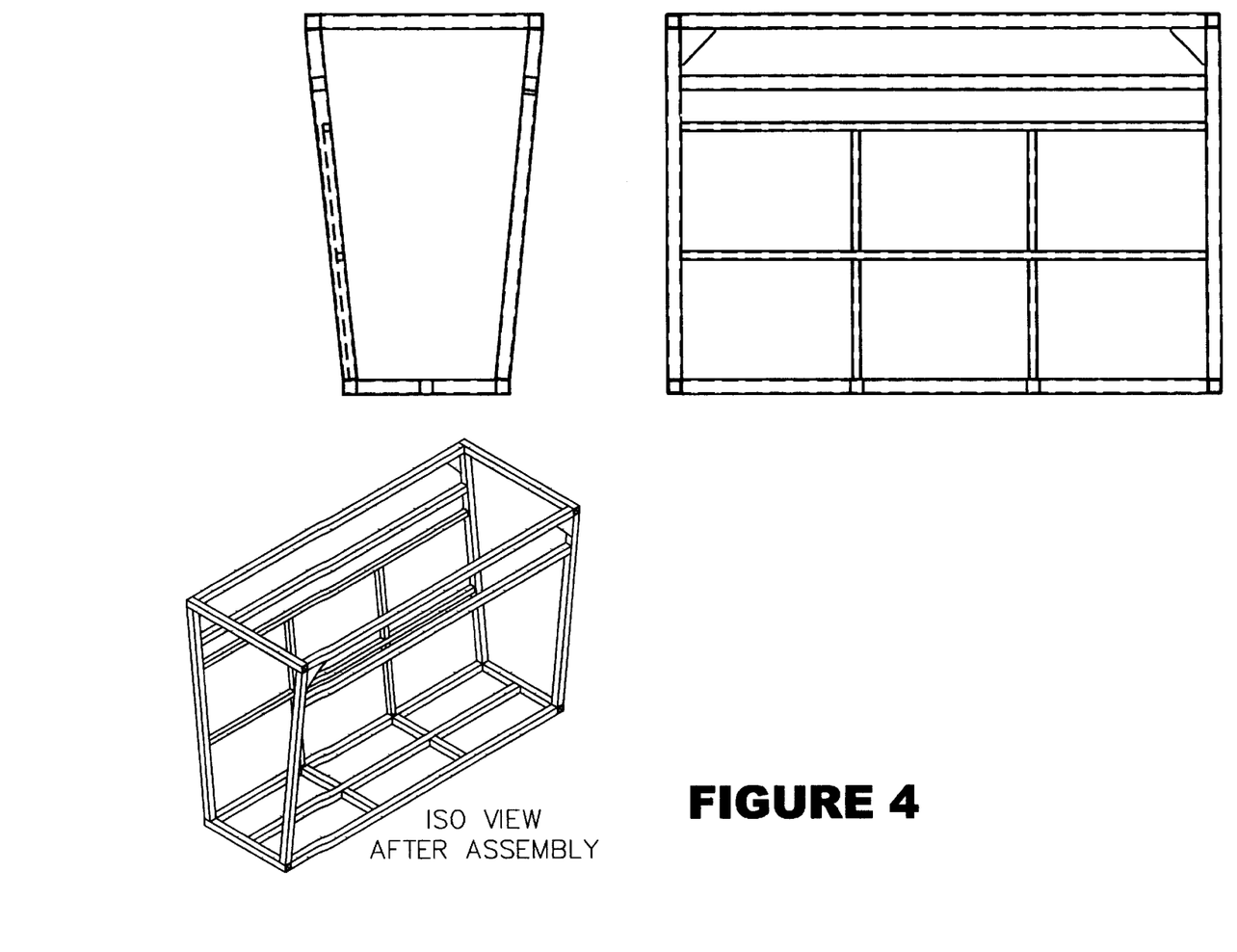
FIG. 4 is a plan view of one end and one side of the chute and iso view of the chute.

The safety gate 22 as illustrated in FIG. 3 is comprised of a panel 58 with support bars 60 welded to the panel 58. The structure is not critical.

Figure 6:
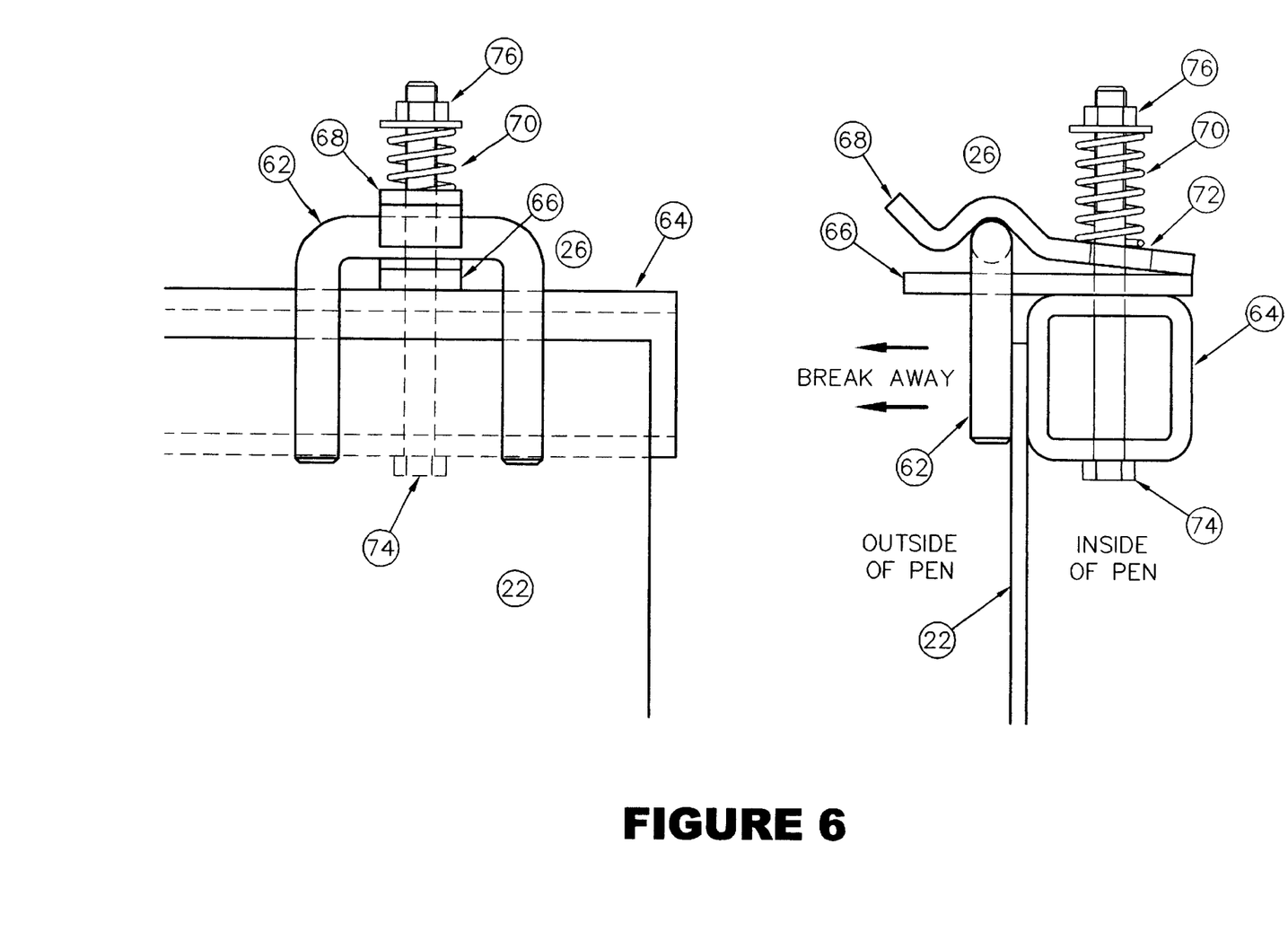
FIG. 6 is a detail of the breakaway latches, including a top view and a side view from the outside of the pen.
Figure 7:
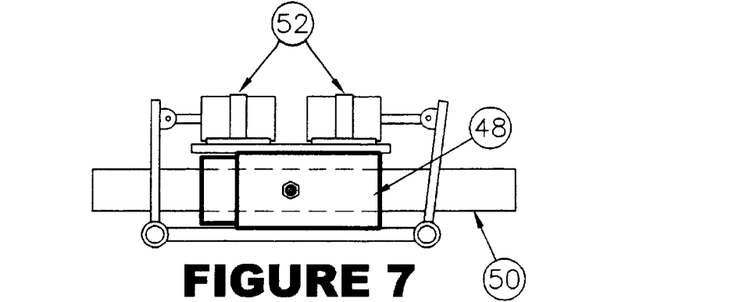
FIG. 7 is a detail of an alternative construction for the actuators and the door operating linkage.

The breakaway latches 26 are shown in detail in a top and side view in FIG. 6. The safety gate 22 is located between a U-shaped rod 62 and a tube 64 which comprises a side of the chute 10. The U-shaped rod 62 is attached to the safety gate 22. A flate plate 66 lies beside the tube 64 and within the sides of the U-shaped rod 62. A curved plate 68 lies next to the flat plate 66 at one end and on the back of the U-shaped rod 64 near the opposite end. A spring 70 provides the resistance required to keep the safety gate 22 in place when the animal is not placing pressure on the safety gate 22. The spring provides sufficient resistance to keep the panel in place during normal use, but not so much resistance as to keep the animal from easily opening the safety gate 22 when panicked in order to leave the chute 10. There is a slot 72 through the tube 64, flat plate 66, and the curved plate 68. A pin 74 runs through the slot 72 and extends past the curved plate 68. The pin 74 secured at each end with a lock nut 76. The structure of the latches 26 is not critical, so long as the function is served.

It is recognized that various equivalents, alternatives and modifications are possible within the scope of the following claims.

I claim:

1. An animal chute comprising:
   a. a data collection area having an ingress opening and an egress opening;
   b. an animal-actuated first gate moveable between an open position for ingress into the data collection area and a closed position barring the ingress opening, wherein an animal actuates the first gate to gain entrance to the data collection area and the first gate automatically locks once the animal passes the first gate upon entrance to the data collection area;
   c. an animal-actuated second gate moveable between an open position for egress out of the data collection area and a closed position barring the egress opening, wherein the second gate automatically locks once the first gate is passed, and wherein the second gate automatically unlocks after data collection to allow the animal to egress from the data collection area; and
   d. a data collection device, wherein data may be collected while the first and a second gate are locked.

2. The animal chute of claim 1 further comprising
   e. a safety gate.

3. The animal chute of claim 2 wherein the safety gate is a side panel of the animal chute that releases if an animals exerts pressure against it in order to release the animal from the chute safely.

4. The animal chute of claim 1 wherein the first gate and the second gate operate via linear actuators.

5. The animal chute of claim 1 wherein the data collected is identification of the animal.

6. The animal chute of claim 1 wherein the data collected is weight of the animal.

7. The animal chute of claim 5 wherein the identification of the animal is achieved via radio frequency reader panels.

8. The animal chute of claim 1 wherein the animal actuates the first gate via infrared beam(s).

9. The animal chute of claim 1 wherein the data is collected into a personal computer for analysis.

10. The animal chute of claim 1 wherein gate opening, closing, and locking are controlled by a programmable logic controller.

11. The animal chute of claim 1 wherein the animal chute separates pen(s) on a first end of the chute and pen(s) on a second, opposite end of the chute.

12. The animal chute of claim 6 wherein animal feed is on a first end end of the chute and water is on a opposite, second end of the chute.

13. The animal chute of claim 12 wherein the only path from the pen on the first end of the chute to the pen on the second end of the chute is through the chute and the data collected are the identification of the animal and the weight of the animal in order to determine the consumption of the animal.

14. An animal directing device comprising the animal chute of claim 3.

15. The animal directing device of claim 14 further comprising at least one ingress control door to the animal chute from a corresponding number of ingress pens and at least one egress control door to a corresponding number of egress pens in order to direct animals from a selected ingress pen to a selected egress pen.

* * * * *